(12) United States Patent
Ford

(10) Patent No.: US 7,934,471 B2
(45) Date of Patent: May 3, 2011

(54) VIVARIUM AND FILTRATION SYSTEM

(76) Inventor: Derek B. Ford, Cleveland, OH (US)

(*) Notice: Subject to any disclaimer, the term of this patent is extended or adjusted under 35 U.S.C. 154(b) by 118 days.

(21) Appl. No.: 12/350,956

(22) Filed: Jan. 8, 2009

(65) Prior Publication Data

US 2009/0178623 A1 Jul. 16, 2009

Related U.S. Application Data

(60) Provisional application No. 61/019,837, filed on Jan. 8, 2008.

(51) Int. Cl.
*A01K 63/00* (2006.01)
(52) U.S. Cl. .................................. 119/246; 119/248
(58) Field of Classification Search .......... 119/246–248, 119/251, 252, 224–227, 219
See application file for complete search history.

(56) References Cited

U.S. PATENT DOCUMENTS

| | | | | |
|---|---|---|---|---|
| 3,584,602 A | * | 6/1971 | Stasio | 119/252 |
| 3,747,566 A | | 7/1973 | Lovitz | |
| 4,120,265 A | * | 10/1978 | Davis | 119/248 |
| 4,708,089 A | | 11/1987 | Goldman et al. | |
| 4,754,571 A | * | 7/1988 | Riechmann | 47/59 R |
| 4,787,336 A | * | 11/1988 | Lineberry | 119/246 |
| 4,995,334 A | | 2/1991 | Wechsler | |
| 5,000,118 A | * | 3/1991 | Merritt et al. | 119/246 |
| 5,127,366 A | * | 7/1992 | Kim | 119/246 |
| 5,445,112 A | * | 8/1995 | Grosman | 119/265 |
| 5,560,318 A | * | 10/1996 | Yoshida et al. | 119/248 |
| 5,693,220 A | | 12/1997 | Sceusa | |
| 5,799,609 A | | 9/1998 | Burns et al. | |
| 6,029,605 A | | 2/2000 | Licata | |
| 6,283,061 B1 | | 9/2001 | Dunn | |
| 6,443,099 B1 | * | 9/2002 | Boggs | 119/248 |

* cited by examiner

*Primary Examiner* — Rob Swiatek
*Assistant Examiner* — Kristen C Hayes
(74) *Attorney, Agent, or Firm* — D.A. Stauffer Patent Services

(57) ABSTRACT

A vivarium and assembly for maintaining an aquatic area, wetlands, and dry land. The assembly is an enclosure for adhering to a transparent sidewall of an aquarium tank to provide sidewalls, a dry wall and a dividing wall positioned between the dry wall and the aquarium tank wall to define an aquatic area by the aquarium tank wall and a wetlands area by the dry wall. The enclosure can be surrounded by dry land area. A filtering system includes a water passage between the aquatic area and the wetland area; a water pump connected for pumping water out of the wetland area and back into the aquatic area; a particulate filter between the wetland area and the pump; and an organic filter in the wetland area, the organic filter being a living wetland plant rooted in a growing medium.

12 Claims, 3 Drawing Sheets ing system incorporated into a structure for placement in an aquarium tank, the structure including a dry sunning platform and a ramp for amphibians to climb up out of the aquatic pond area.
VIVARIUM AND FILTRATION SYSTEM

CROSS-REFERENCE TO RELATED APPLICATIONS

This application claims the benefit of U.S. Provisional Patent Application No. 61/019,837 filed Jan. 8, 2008 by Derek B. Ford.

BACKGROUND OF THE INVENTION

Aquariums are well known. For home use, they typically comprise an open top box-like "tank" with transparent (usually glass) sidewalls all around, or at least on one side. The tank is filled with water and allows observation of fish that are placed in it. To provide a viable aquatic environment, a water filter and pump, lighting and a cover, and a bottom material like gravel are added. Aqua-scaping can be added such as real or artificial rocks, logs, water plants, replica underwater structures and the like.

The typical pet store aquarium tank is versatile and inexpensive, so it is also adapted by consumers for other animal-viewing habitats, and the stores accommodate this by providing a variety of kits and supplies for doing so. With dry "land" filling instead of water, the tank becomes a "terrarium" for non-aquatic animals including mice, snakes, ants, etc. Optionally, the landscaping can be enhanced enough to create a "paludarium" that approximates real-life habitats like bogs, riverbanks with flowing streams, rainforests, etc.

The most varied adaptation is a "vivarium" that includes three environments to support amphibious animals, like turtles, and optionally also aquatic and/or terrestrial animals (e.g., fish and/or snakes, respectfully). Of course a vivarium can also be used simply as a habitat for only one kind of animal. For example, terrestrial animals will live on the dry land, but can use the aquatic portion for drinking water, instead of an artificial and inappropriate looking water dish. Besides improving appearance, the aquatic portion can be continuously cleaned by a fish tank pump and filter, as opposed to removing the dish for periodic cleaning. Thus, for a vivarium there is a need for kits and supplies that provide for a dry land environment, an aquatic environment, and a wetland environment (e.g., marsh or bog).

The prior art includes U.S. Pat. No. 5,693,200 (Sceusa; Dec. 2, 1997) that discloses an aquarium filtration system for semi-aquatic animals that includes a reverse flow filtration system incorporated into a structure for placement in an aquarium tank, the structure including a dry sunning platform and a ramp for amphibians to climb up out of the aquatic pond area.

U.S. Pat. No. 6,283,061 (Dunn; Sep. 4, 2001) discloses a terrarium filtering system for maintaining a wet environment, a moist environment, and a dry environment within an aquarium tank. The filtering system includes a terrarium filter plate submerged beneath the water level in the wet environment. The filter plate has water flow holes and water movers connected to a bubbling system to provide aeration and create a water flow, and a passive waste neutralization system including carbon and ammonia neutralizers submerged beneath the water level and located in the path of the water flow to neutralize toxic wastes. The terrarium filter plate is also covered with a filtering media and together they act as a filtering device. Waste materials in the water are moved by flowing water to be trapped in the filtering media, and the porous passive neutralization system in the plate is used to offset toxins in the water flow.

U.S. Pat. No. 6,029,605 (Licata; Feb. 29, 2000) discloses a tank that provides multiple environments in upper and lower regions of the tank. A land plate divides the tank into the upper and lower regions and provides a terrestrial environment in which terrestrial and amphibious animals can live. A ramp extends from the land plate into the lower region, which is filled with water to a minimum water level of at least the bottom edge of the ramp. When filled with water to the minimum water level, the lower region provides an aquatic environment in which aquatic and amphibious animals can live. The ramp allows travel between the terrestrial environment and the aquatic environment. An opening in an end of the tank beneath the land plate allows for easy access to and maintenance of the aquatic environment. An island can also be placed beneath the land plate, and opaque material can be placed on the walls of the tank in the lower region to provide a subterranean environment.

BRIEF SUMMARY OF THE INVENTION

According to the invention the vivarium assembly is a small water tank made out of plastic resin that will be used by people who keep fish, reptiles, amphibians, and even insects and plants in terrariums and vivariums. The vivarium assembly features a swimming and drinking area for the small animals and a wetland area.

The water is kept clean and fresh by internal and external filters. The internal filtering system doubles as a small beach/wetland in which animal waste is utilized as fertilizer for live plants. (The nitrogen and carbon dioxide found in animal waste is turned into oxygen by the plants). Ammonia and other harmful substances are further eliminated by passing through the external filter that contains carbon and ceramic media.

The vivarium provided by the inventive vivarium assembly is unique because it allows full observation of aquatic pets without the daily hassle of constantly changing a water dish for land based pets. This also allows minimal disturbance of vivarium inhabitants. It also provides a area for planting live bog plants that help simulate life in the wild. The plants will be fertilized by use of animal waste, thereby providing a novel symbiotic organic filter.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Such relationships, if any, between similar elements in the same or different figures will become apparent throughout the specification, including, if applicable, in the claims and abstract.

Figure 1:
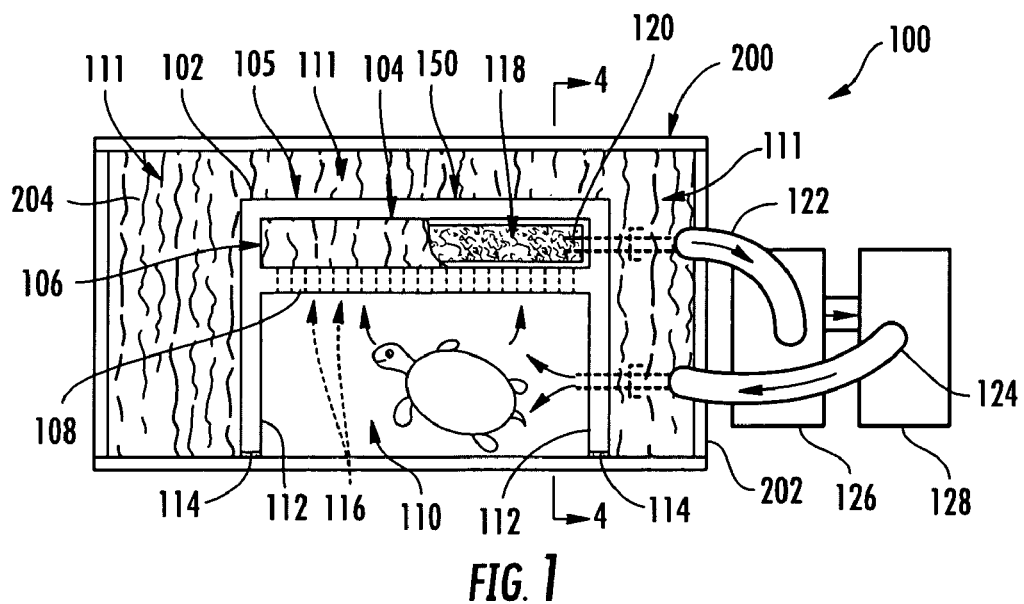
Figure 2:
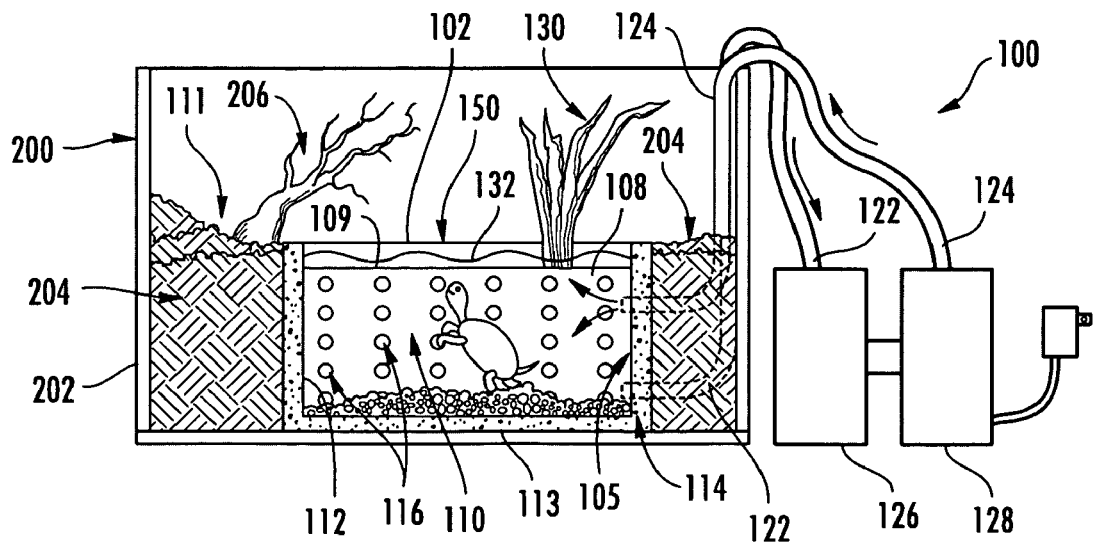

The structure, operation, and advantages of the present preferred embodiment of the invention will become further apparent upon consideration of the following description taken in conjunction with the accompanying drawings, wherein:

FIGS. 1 and 2 are top and side views, respectively, of a vivarium showing a vivarium assembly operatively installed in an aquarium tank, according to the invention.

Figure 3:
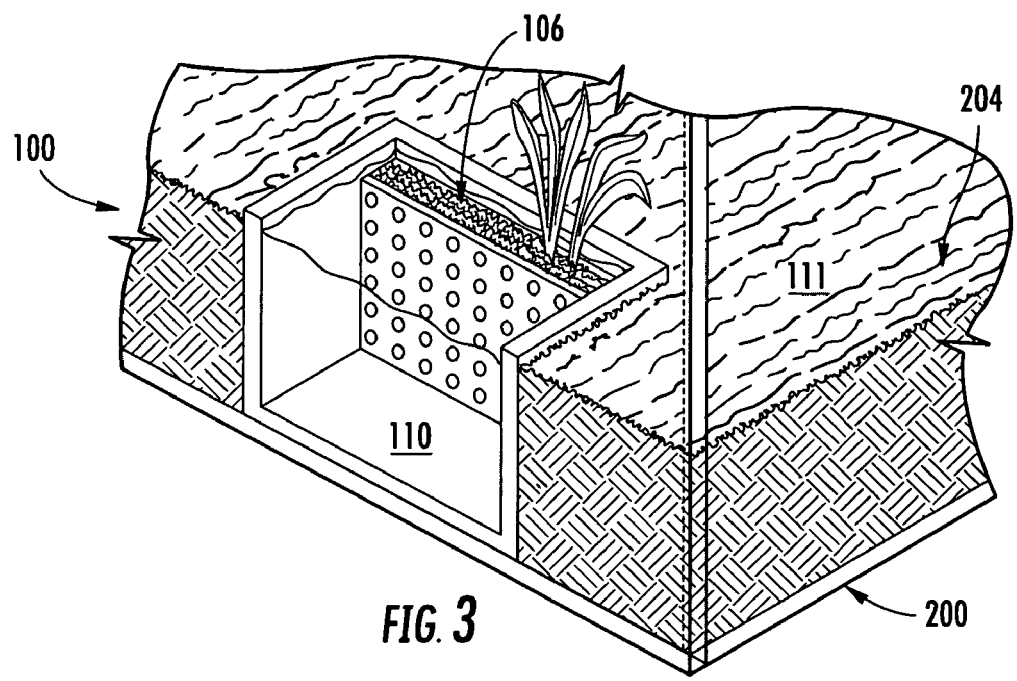

FIG. 3 is a perspective view of a portion of the vivarium of FIGS. 1 and 2, according to the invention.

Figure 4:
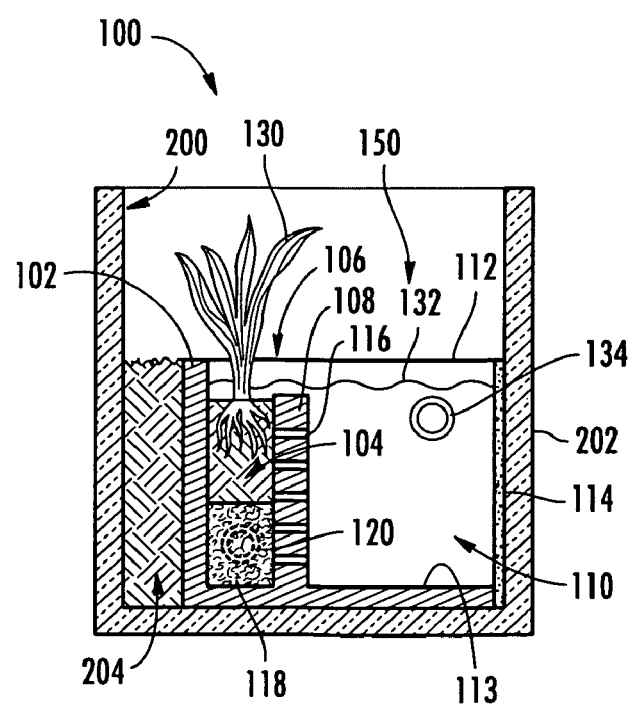

FIG. 4 is a cross-sectional view of the vivarium taken along the line 4-4 in FIG. 1, according to the invention.

Figure 5:
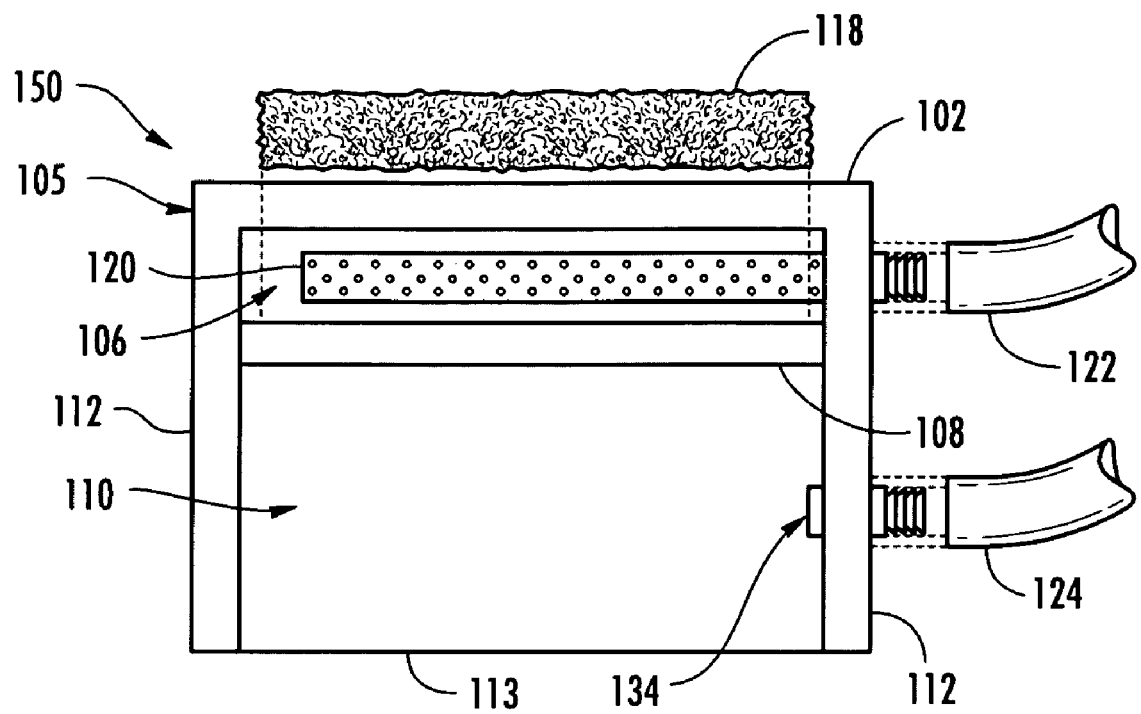

FIG. 5 is a top view of portions of the vivarium assembly, according to the invention.

DETAILED DESCRIPTION OF THE INVENTION

The present invention provides a vivarium type of habitat 100 constructed to provide a living space for a wide variety of small animals. In a preferred embodiment, the provided vivarium 100 has a wet environment 110 (i.e., an aquatic area, fish tank, and the like), a moist environment 106 (i.e., wetlands, bog, marsh, and the like), and a dry environment 111 (i.e., dry land), all contained within an aquarium tank 200 having transparent walls 202 enabling observation. Thus a preferred embodiment of the inventive habitat provides a varied and interesting living space for semi-aquatic (amphibious) animals like frog, newts, and/or turtles; but there is also habitat for fully aquatic animals, such as fish, and/or land-based animals, such as insects, snakes, or even small birds.

In its simplest form, the invention is a vivarium assembly 150 that can be sold as a kit for use in constructing a vivarium 100 by building the inventive vivarium assembly 150 into an open top box 200, preferably an aquarium tank 200. The assembly 150 includes an enclosure 105 defining wet 110 and moist 106 areas, and when built into the tank 200, the rest of the tank 200 outside the enclosure 105 can be filled with land materials 204 (dirt, sand, etc.) to provide the third vivarium component—the dry land area 111. Preferably the inventive vivarium assembly 150 includes components for an inventive built-in filtering system and can also be supplied with a conventional external aquarium pump 128 and/or a supplementary inline filter 126 that may be combined with the pump 128.

Given the inventive components of the assembly 150, the scope of the invention thus includes a pre-assembled complete vivarium 100 that incorporates the inventive vivarium assembly 150.

The inventive habitat is comprised of an enclosure 105 with containing walls 102, 108, 112 built of preferably rigid material, such as plastic resin, the enclosure 105 including both an aquatic area 110 and a "wetland" area 106 separated by a dividing wall 108, to create, for example, a paludarium. Referring particularly to FIG. 1, parallel spaced apart sidewalls 112 extend back from an open front end to a back end "dry" wall 102 extending laterally therebetween and sealingly attached thereto. The dividing wall 108 is spaced forward from the dry wall 102 and similarly extends laterally between, and is attached to, the sidewalls 112. Preferably the sidewalls 112 and the dry wall 102 are about the same height. A novel aspect of the enclosure 150 is that it uses a transparent wall 202 of the aquarium tank 200 for the missing front wall, thereby completely enclosing and containing the water in the aquatic area 110, thereby completing the installed enclosure 150 such that the wet aquatic area 110 and the moist wetland area 106 are contained within a limited portion of the aquarium tank 200; thereby providing for an optional dry land area 111 in the remainder of the aquarium tank 200. The sidewalls 112 are sealingly attached to the tank wall 202 with a suitable watertight adhesive 114. It can be seen that this arrangement provides for creative arrangement of the various areas in the vivarium 100.

The wet area 110 and the moist area 106 are connected by a water passage 109, 116 to allow water to circulate between them. One preferred embodiment separates these two areas by a dividing wall 108 of permeable material, preferably a wall that contains "weep holes" 116 sufficient for water and small debris to pass through. In another embodiment, a top edge 109 of the dividing wall 108 is located below a level 132 of the water when the aquatic area 110 is filled (i.e., the dividing wall 108 is not as tall as the sidewalls 112 and dry wall 102).

The moist "wetlands" area 106 is a cavity that contains a filter 104 for the water. Flowingly connected to the wetlands 106 and the aquatic area 110 (e.g., through tubing 122, 124), an aquarium pump 128 (e.g., external) circulates water into the aquatic area 110 via inlet 134, through the filtering medium 104 in the wetlands area 106, out to the pump 128, and back into the aquatic area 110. An enhanced embodiment of the invention supplements the internal filter 104 with a supplementary filter 126, e.g., an external aquarium filter that is attached in series with the external pump 128. Because the arts regarding the design of pumps and inline filters (e.g., for aquariums) are well known, they are not described further in this disclosure.

Referring to FIGS. 1, 4 and 5, an inventive water filter 104 is illustrated wherein the filter in the moist area is a self-sustaining organic filter comprised of live plants 130 and a porous growing medium 104, such as wetland planting soil. Preferably in addition, a permeable medium, such as foam, provides a particulate filter 118 to separate the growing medium 104 from a water outlet 120, thereby keeping the growing medium 104 in the moist area 106. Optionally, the particulate filter 118 can be supported by a perforated tube 120. Of course other particulate filters 118 are available and any suitable one may be used, including simply a finely perforated tube without an added permeable medium like foam.

Water circulates from the aquatic area 110, through the water passage(s) 109, 116 into the wetland area 106, carrying debris such as animal waste and excess (uneaten) food into the growing medium 104 where it is at least partly filtered out of the water as it passes through on its way to the pump 128. The debris fertilizes the plants 130 of the wetlands area through their roots. Because the plants 130 utilize the debris from the aquatic area to grow, there is no need to clean the "organic filter" 104. Thus, the internal filter 104 is self-cleaning. Living plants 130 are further advantageous because they convert carbon dioxide to oxygen.

A preferred embodiment of the inventive habitat comprises a vivarium assembly 150 that can be sold separately (e.g., as a kit) for consumers to add to an aquarium tank 200 in a way that allows for their own creativity. The vivarium assembly 150 is a enclosure 105 having at least one open (wall-less) side that may be attached to another surface (e.g., aquarium wall 202) using an adhesive 114 such as silicone glue, that forms a water tight and water resistant seal. Thus the other surface becomes a wall for the enclosure 105. The vivarium assembly 150 may thus be used as a modification for a pre-existing animal habitat, such as an aquarium or terrarium, by attaching the assembly 150 to the inside of a transparent wall 202 of the pre-existing habitat, thereby providing a convenient side view into the aquatic habitat 110. In an embodiment wherein a sidewall 112 is also omitted, then the assembly 150 can be attached in a corner of an aquarium tank 200 to provide two side views, etc. Dry land 111 can be provided and teraformed as desired within the habitat area surrounding the inventive assembly 150. Of course a variety of sizes for the vivarium assembly 150 relative to aquarium tank 200 sizes will allow for creative variation of the dry land area 111, particularly given that the assembly can be positioned against a transparent wall 202 almost anywhere in the tank 200.

FIGS. 1 and 2 illustrate an embodiment of the inventive vivarium 100 in use with semi-aquatic animals (e.g., a turtle as shown). The inventive enclosure 105 is surrounded by dry land 111 such that the turtle can swim in the aquatic area 110, crawl out (e.g., over the dividing wall 108, preferably lowered, and through the wetlands 106), and thence up onto the dry land 111. The surface of the wetland area 106 may be sloped up to the dry wall 102 of the enclosure 105, thereby easing egress of the turtle onto the dry land 111 surrounding the enclosure 105. Any dimensions or materials stated herein are only examples of a preferred embodiment, and are not to be considered limiting of the scope of the present invention as claimed.

In a preferred embodiment, the inventive habitat is a vivarium 100 with a filtration system 104 providing a swimming and drinking area for small animals. The water is kept clean and fresh by the internal filter 104 and optionally an external filter 126. The inventive internal filtering system 104 doubles as a beach/wetland area 106 in which animal waste is utilized as fertilizer for live plants 130. Nitrogen and carbon dioxide found in animal waste is turned into oxygen by the plants 130. Ammonia and other harmful substances can be further eliminated by passing the water flow through a secondary filter 126 that contains toxin-neutralizing media, for example carbon and ceramic media.

The vivarium 100 provided by the inventive vivarium assembly 150 is unique because it allows full observation of aquatic pets without the daily hassle of constantly changing a water dish for land based pets. This also allows minimal disturbance of vivarium inhabitants. It also provides a moist area 106 for planting live bog/marsh plants 130 that help simulate life in the wild as well as producing oxygen. The plants 130 are fertilized by animal waste trapped by the growing medium 104 as the water circulates through it, thereby providing a novel symbiotic organic filter.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention as claimed are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A vivarium assembly for creating separated wet, moist, and dry environments within an aquarium tank, the vivarium assembly comprising:
    an enclosure comprising:
        at least one sidewall defining a vertical height and a longitudinal length between a back end and a distal front end forward of the back end,
        a laterally extending dry wall sealingly attached to the back end, and
        a laterally extending dividing wall spaced forward from the dry wall and sealingly attached to the at least one sidewall,
        thereby defining a wetland area that is between the dividing wall and the dry wall, and an aquatic area forward of the dividing wall;
    adhesive for sealingly attaching the enclosure to one or more walls of the aquarium tank, thereby completing the enclosure such that the aquatic area and the wetland area are contained and separated from a dry land area in a remainder of the aquarium tank;
    a water passage between the aquatic area and the wetland area;
    a water pump connected for pumping water out of the wetland area and back into the aquatic area; and
    an organic filter in the wetland area, the organic filter comprising a living wetland plant rooted in a porous growing medium such that water circulating through the water passage carries animal waste from the aquatic area into the growing medium where the plant can absorb the waste as fertilizer which it converts to oxygen.

2. The vivarium assembly of claim 1, further comprising: weep holes through the dividing wall, thereby providing the water passage.

3. The vivarium assembly of claim 1, further comprising: a top edge of the dividing wall having a vertical height less than the dry wall and the at least one sidewall, thereby providing the water passage.

4. The vivarium assembly of claim 1, further comprising: a particulate filter between the organic filter and the pump.

5. The vivarium assembly of claim 4, further comprising: a permeable foam medium and a perforated tube flowingly connected to the pump and located in the wetland area thereby providing the particulate filter.

6. The vivarium assembly of claim 1, further comprising: a secondary filter associated with the pump.

7. The vivarium assembly of claim 6, further comprising: toxin-neutralizing media comprising the secondary filter.

8. A vivarium assembly for creating an aquatic area and a wetland area, both within an aquarium tank, the vivarium assembly comprising:
    an enclosure comprising at least one sidewall defining a vertical height and a longitudinal length between a back end and a distal front end forward of the back end, and sealingly connected thereto: a dry wall and a dividing wall spaced forward from the dry wall, thereby defining a wetlands area that is between the dividing wall and the dry wall, and an aquatic area forward of the dividing wall;
    adhesive for sealingly attaching the enclosure to one or more walls of the aquarium tank, thereby completing the enclosure such that the aquatic area and the wetland area are contained within a portion of the aquarium tank;
    a water passage between the aquatic area and the wetland area;
    a water pump connected for pumping water out of the wetland area and back into the aquatic area; and
    an organic filter in the wetland area, the organic filter comprising a living wetland plant rooted in a porous growing medium such that water circulating through the water passage carries organic debris from the aquatic area into the growing medium where the plant can absorb the debris.

9. The vivarium assembly of claim 8, further comprising: weep holes through the dividing wall, thereby providing the water passage.

10. The vivarium assembly of claim 8, further comprising:

a top edge of the dividing wall having a vertical height less than the dry wall and the at least one sidewall, thereby providing the water passage.

11. The vivarium assembly of claim 8, further comprising:
a particulate filter between the organic filter and the pump.

12. The vivarium assembly of claim 11, further comprising:
a permeable foam medium and a perforated tube flowingly connected to the pump and located in the wetland area thereby providing the particulate filter.

* * * * *